United States Patent Office 3,592,714
Patented July 13, 1971

3,592,714
LAMINAR STRUCTURES OF POLYIMIDES AND METHOD OF MANUFACTURE
Morton Katz, Williamsville, N.Y., assignor to E. I. du Pont de Nemours and Company, Wilmington, Del.
No Drawing. Filed Dec. 26, 1968, Ser. No. 787,249
Int. Cl. B32b 27/08, 27/34; H01b 3/30
U.S. Cl. 156—329                                    2 Claims

ABSTRACT OF THE DISCLOSURE

A laminar article is provided of a layer of a polyimide and a layer of a fluorinated polymer, which structure is suitable in the form of narrow tapes for electrical insulation uses.

THE INVENTION

The present invention relates to laminar structures and a method of manufacture thereof. More particularly, the present invention is directed to improvements in and relating to laminar articles of polyimides and fluorinated polymeric materials and to a method of manufacture thereof.

Laminar articles of polyimide polymeric materials and fluorocarbon polymers are known articles of manufacture desirable for many diverse uses because characterized by a unique combination of physical properties not separately possessed by each individual constituent material thereof. The main drawback of such laminar structures resides in the lack of sufficient bond strength and durability when exposed to environments of high moisture content. For instance, U.S. Pat. No. 3,179,634 describes laminar structure of polyimide and fluoropolymer wherein the composite is formed by treating the surface of a self-supporting film of a tetrafluoroethylene/hexafluoropropylene copolymer with an electrical discharge to improve surface adherability, coating the treated film by solvent-casting thereon a polyamide-acid precursor of the desired polyimide, and then converting the polyamide-acid layer to polyimide by treatment with acetic anhydride and pyridine, followed by solvent removal in a vacuum oven at 100 C. A major drawback of such structures resides in the lack of adequate bond strength when exposed to moisture. It is, therefore, the principal object of the present invention to provide a novel laminar structure of polyimide and fluorocarbon polymeric materials characterized by improved bond strength especially when exposed to water or high moisture containing environments.

According to the present invention there is provided a laminar structure comprising a layer of a polyimide and a layer of a fluorocarbon polymeric material characterized by improved bond strength and durability when exposed to environments of high moisture content. The laminar structure preferably comprises a layer of polyimide and a layer of a copolymer of hexafluoropropylene and tetrafluoroethylene. In another embodiment, the laminar structure comprises a layer of polyimide and a layer of a copolymer of between about 5% and about 50% by weight, based upon the total copolymer weight, of hexafluoropropylene and between about 50% and about 95% by weight, based upon the total copolymer weight, of tetrafluoroethylene.

According to the present invention, there is further provided a method of manufacture for making laminar structures which comprises contacting at least one surface of a polyimide film structure with gamma-aminopropyltriethoxysilane, applying to said surface a fluorocarbon polymer, and heating said structure at a temperature between about 325° C. and about 450° C. In a preferred embodiment, the method comprises contacting at least one surface of a polyimide film structure with an aqueous solution of between about 1% and about 10% by volume of gamma-aminopropyltriethoxysilane, applying to said surface a fluorocarbon polymer, and heating said structure at a temperature between about 325° C. and about 450° C.

The laminar structure of the invention is characterized by at least one layer of a polyimide of the following recurring structural unit:

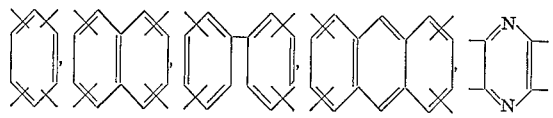

where R is a tetravalent aromatic organic radical including the following and substituted derivatives thereof:

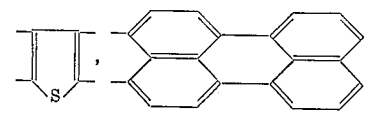

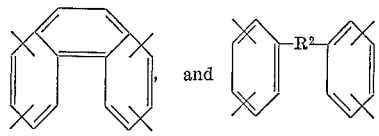

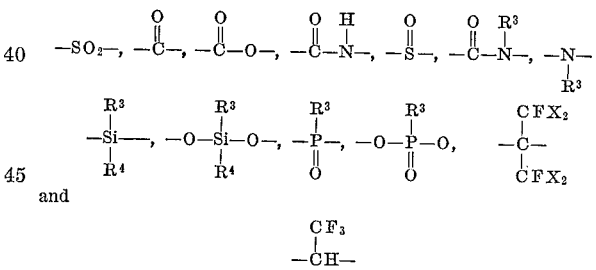

where $R^2$ is alkylene of 1–3 carbon atoms, oxygen, sulfur, or one of the following:

$$-SO_2-,\ -\overset{O}{\underset{\|}{C}}-,\ -\overset{O}{\underset{\|}{C}}-O-,\ -\overset{O}{\underset{\|}{C}}-\overset{H}{\underset{|}{N}}-,\ -\overset{O}{\underset{\|}{S}}-,\ -\overset{O}{\underset{\|}{C}}-\overset{R^3}{\underset{|}{N}}-,\ -\underset{R^3}{\overset{|}{N}}-$$

$$-\underset{R^4}{\overset{R^3}{\underset{|}{\overset{|}{Si}}}}-,\ -O-\underset{R^4}{\overset{R^3}{\underset{|}{\overset{|}{Si}}}}-O-,\ -\underset{O}{\overset{R^3}{\underset{\|}{\overset{|}{P}}}}-,\ -O-\underset{O}{\overset{R^3}{\underset{\|}{\overset{|}{P}}}}-O,\ -\underset{CFX_2}{\overset{CFX_2}{\underset{|}{\overset{|}{C}}}}-$$

and $$-\underset{CH}{\overset{CF_3}{\underset{|}{\phantom{|}}}}-$$

wherein $R^3$ and $R^4$ are alkyl or aryl, and substituted groups thereof, and each X is separately chosen from the group consisting of F and Cl, the said R being such as obtained from a dianhydride of the formula

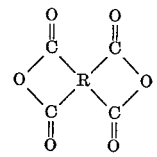

where R has the same meaning as above; and where $R^1$ is a divalent aromatic radical (arylene), preferably one of the following groups: phenylene, naphthylene, biphenylene, anthrylene, furylene, benzfurylene, and

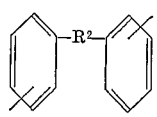

wherein $R^2$ is as defined above. The $R^1$ groups are conveniently derived from organic diamines having the formula $H_2N-R^1-NH_2$ where $R^1$ is above defined. In such R radicals indicated hereinabove having free valencies shown in indefinite positions, the free valencies are so disposed that there are two pairs of valencies, each pair being either ortho or peri.

Suitable polyimides for the laminar structure of the present invention include such as are derived from the following dianhydrides:

pyromellitic dianhydride;
3,4,9,10-perylenetetracarboxylic dianhydride;
naphthalene-2,3,6,7-tetracarboxylic dianhydride;
naphthalene-1,4,5,8-tetracarboxylic dianhydride;
bis(3,4-dicarboxylphenyl) ether dianhydride;
bis(3,4-dicarboxyphenyl) sulfone dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
pyrazine-2,3,5,6-tetracarboxylic dianhydride;
benzene-1,2,3,4-tetracarboxylic dianhydride;
thiophene-2,3,4,5-tetracarboxylic dianhydride;
2,3,2',3'-benzophenonetetracarboxylic dianhydride;
3,4,3',4'-benzophenonetetracarboxylic dianhydride;
benzoylpyromellitic dianhydride;
6-(3',4'-dicarboxybenzoyl)-2,3-naphthalene dicarboxylic dianhydride;
4'-(3'',4''-dicarboxybenzoyl)-3,4-diphenyl dicarboxylic dianhydride;
4-(3',4'-dicarboxybenzoyloxy)phthalic dianhydride;
4-(3',4'-dicarboxybenzamido)phthalic dianhydride;
bis(3,4-dicarboxyphenyl) sulfide dianhydride;
bis(2,3-dicarboxyphenyl)methane dianhydride;
bis(3,4-dicarboxyphenyl)methane dianhydride;
1,1-bis(2,3-dicarboxyphenyl)ethane dianhydride;
1,1-bis(3,4-dicarboxyphenyl)ethane dianhydride;
2,2-bis(2,3-dicarboxyphenyl)propane dianhydride;
2,2-bis(3,4-dicarboxyphenyl)propane dianhydride;
2,2-bis(3,4-dicarboxyphenyl)-1,1,1-trifluoroethane dianhydride;
2,2-bis(3,4-dicarboxyphenyl)hexafluoropropane dianhydride;
2,2-bis(3,4-dicarboxyphenyl)-1-chloro-1,1,3,3,3-pentafluoropropane dianhydride;
2,2-bis(3,4-dicarboxyphenyl)-1,3-dichloro-1,1,3,3-tetrafluoropropane dianhydride;
2,2-bis(3,4-dicarboxyphenyl)-1,1,3,3-tetrachloro-1,3-difluoropropane dianhydride;

position isomers of the above, etc., and mixtures thereof.

Suitable polyimides for the laminar structure of the present invention also include such as are derived from the following diamines:

meta-phenylenediamine;
para-phenylenediamine;
2,2-bis(4-aminophenyl)propane;
4,4'-diaminodiphenylmethane;
4,4'-diaminodiphenyl sulfide;
4,4'-diaminodiphenyl sulfone;
3,3'-diaminodiphenyl sulfone;
4,4'-diaminodiphenyl ether;
2,6-diaminopyridine;
bis(3-aminophenyl)diethyl silane;
benzidine;
3,3'-dichlorobenzidine;
3,3'-dimethoxybenzidine;
4,4'-diaminobenzophenone;
N,N-bis(4-aminophenyl)-n-butylamine;
N,N-bis(4-aminophenyl)methylamine;
1,5-diaminonaphthalene;
3,3'-dimethyl-4,4'-diaminobiphenyl;
m-aminobenzoyl-p-aminoanilide;
4-aminophenyl 3-aminobenzoate;
1,1-bis(4-aminophenyl)ethane;
4,4'-diaminodiphenyl sulfoxide;
3,3'-diaminobenzophenone;
2,2'-diaminobenzophenone;
2,2-bis(4-aminophenyl)hexafluoropropane;
2,2-bis(4-aminophenyl)-1,3-dichloro-1,1,3,3-tetrafluoropropane;
N,N-bis(4-aminophenyl)aniline;
2,4-bis(beta-amino-t-butyl)toluene;
bis(p-beta-amino-t-butylphenyl)ether;
p-bis-2-(2-methyl-4-aminopentyl)benzene;
p-bis(1,1-dimethyl-5-aminopentyl)benzene;
m-xylylenediamine;
p-xylylenediamine;

position isomers of the above, etc., and mixtures thereof.

The polyimides and polyamide-acids are more fully described in patents such as U.S. 3,179,614 and U.S. 3,179,634. The thickness of the polyimide layer is between about 0.25 mil and about 5 mils, preferably between 0.5 and 2.0 mils.

The laminar structure of the invention is further characterized by a layer of a fluorocarbon polymeric material. The expressions "fluorocarbon polymer" and "fluorocarbon polymeric material" as used herein mean polytetrafluoroethylene (TFE) and copolymers of tetrafluoroethylene and hexafluoropropylene (FEP). The fluorocarbon polymers are extensively described in such patents as U.S. 2,833,686; 2,946,763 and 3,051,683. The layer of fluorocarbon polymer is preferably a copolymer of between about 50% and about 95% tetrafluoroethylene and between about 5% and about 50% of hexafluoropropylene, especially wherein the amount of hexafluoropropylene is between about 7% and about 27%. Optionally, the fluorocarbon polymer layer may be blended with up to 95% by weight (of the total weight of the two polymers) of a homopolymer of tetrafluoroethylene. The thickness of the fluorocarbon polymer layer is preferably between about 0.05 mil and about 0.3 mil.

A salient feature of the present invention resides in the manner whereby the polyimide layer and the fluorocarbon polymer layer are united to provide a unitary laminar structure. This is accomplished by applying to the polyimide layer a primer (whcih improves the high humidity adhesion between the polyimide and fluoroethylenepropylene polymer layers) of hydrolyzed gamma-aminopropyltriethoxysilane. This material is prepared simply by dissolving gamma-aminopropyltriethoxysilane in water, or in a medium containing some water, before it is applied to the base polyimide. Priming of the base polyimide sheet with the silane can be done by any of the standard priming methods, such as dipping, kiss coating, gravure roll, spraying, etc. All such methods are satisfactory for two-side priming, and all but dipping are suitable for one-side priming. After application of the primer solution, the film may be contacted with wiper rods or rolls to remove any excess not desired before the solvent is removed in the drying operation.

Primer solutions containing about 1 to 10% by volume of gamma-aminopropyltriethoxysilane have been found suitable for use in priming. Solutions containing markedly less than 1% incur an economic penalty because of the large amount of solvent used and/or the burden in removing the solvent during drying; further, unless excessively large amounts of such dilute solution are used, the degree of improvement in high humidity adhesion is not as great as desired. Use of solutions containing markedly more than 10% frequently results in application of amounts of primer greater than what is needed, and is uneconomic. Solutions containing about 2 to 5% by volume of the silane are preferred. The solvent employed as the medium for the silane primer can be all water or a mixture of water and a low molecular weight alcohol, such as ethanol or methanol. Additional suitable solvent media include mixtures of 5% by volume of water and 5% by volume of gamma-aminopropyltriethoxysilane with 90% by volume of any one of methyl ethyl ketone, ethyl acetate, ethyl ether, hexane and benzene. The temperature required to dry the film in the priming step will vary depending on the specific solvents to be removed. Temperatures as low as about 130° C. are suitable for removing alcohols, and as high as 325° C. are permissible for removing water.

The improved product of this invention may be any of several specific constructions. First, the base polyimide film may be treated on either one or both sides with the silane primer. The one-side primed film is substantially coated on the primed side with fluoroethylenepropylene polymer. The two-side primed base film, however, may subsequently be coated on either one or both sides with fluoroethylenepropylene polymer. Whereas the coated side of the one-side primed/one-side coated film cannot be sealed to the uncoated side, the coated side of two-side primed/one-side coated film can be sealed to the uncoated (but primed) side.

The fluoropolymer layer is conveniently applied to the base layer as an aqueous polymer dispersion. More specifically, the fluoropolymer can be applied to the base layer as a layer about 0.02 to 1.0 mil and preferably 0.04 to 0.3 mil thick of an aqueous dispersion of a colloidal copolymer of hexafluoropropylene and tetrafluoroethylene, said copolymer having a hexafluoropropylene content of 5 to 50 weight percent, and preferably 7 to 27 weight percent, and a specific melt viscosity of 1,500 to 300,000 poises, said dispersion having a solids content in the range of about 5% to 65%, at a temperature in the range of from about room temperature up to about 60° C., and heating the composite article at a temperature in the range of from about 325° to 450° C. and preferably 370° to 400° C. for a period of about 0.25 to 15 minutes and preferably 0.5 to 3 minutes. Optionally, the colloidal hexafluoropropylene/tetrafluoroethylene copolymer can have blended therewith up to about 95% on a polymer weight basis of colloidal polytetrafluoroethylene, the solids content of the aqueous dispersion being in the range of about 5% to 65%.

The improved product of this invention possesses a bond between the polyimide and fluorocarbon polymer layers which is markedly improved over that of composites without the silane primer, when exposed to high humidity conditions. The adhesion between the layers of the novel composite, as prepared and under low humidity conditions, is comparable to or only slightly better than that of composites without the silane primer. But upon exposure of the composite of this invention to water or high humidity, the adhesive strength between layers remains at a significantly higher level than that of composites without the primer. More specifically, composites prepared without the primer exhibit heat-seal strengths, as prepared, in the range of about 1000 to 1200 grams per inch; those prepared with the silane primer have heat-seal strengths, as prepared, in the range of about 1000 to 1800 grams per inch. However, if that heat-sealed films are immersed in boiling water before testing, it is found that those with silane primer have heat-seal strengths of 500 to 600 grams per inch after as much as 12 hours immersion, while those without primer have decreased to only 100 to 200 grams per inch in only 2 to 4 hours.

The principle and practice of the present invention will now be illustrated by the following examples which are provided to show the practice and use thereof.

The test samples of the laminar structures prepared in the following examples were evaluated in accordance with the following testing procedure:

Heat seal strength is measured by cutting a piece of the laminar film test sample of 4 inches by 10 inches, with the grain of the film running in the long or machine direction, into two pieces each of 4 inches by 5 inches. The two test pieces are placed in superposed relation so that opposing fluoropolymer surfaces thereof are in contact. The superimposed films are then sealed together at each end at right angles to the grain of the film by means of a ¾ inch wide sealing bar that is heated to a temperature of 350° C. and contacts the film ends at 20 p.s.i. pressure for 30 seconds. The sealed test samples are then cut in half at right angles to the grain of the film, and the two resulting pieces are each cut along their centerline and parallel to the grain of the film to provide 1 inch wide strips. The resulting four sets of strips are tested for heat seal strength by securing the free ends thereof in a Suter testing machine and pulling the test samples apart. The highest force in grams required to pull the strips apart is taken as a measure of the heat seal bond strength.

EXAMPLE 1

A roll of 1-mil film of the polypyromellitimide of bis-(4-aminophenyl) ether was primed with a 90.25/4.75/5 (volume ratio) methanol/water/gamma-aminopropyltriethoxysilane bath made up from 14,440 ml. of methanol, 760 ml. of water and 800 ml. of the silane. The priming operation was carried out at a rate of 50 ft./min. The base film was dipped into the priming bath, wiped with blades (polytetrafluoroethylene), and passed through a two-stage oven, the first zone at 130° C., the second at 140° C., the film being in each zone for about 15 sec.

The primed base film was then coated with an aqueous fluoroethylenepropylene polymer dispersion. The coating bath was a commercially available 55% (wt.) solids aqueous dispersion of copolymer of 85% tetrafluoroethylene and 15% hexafluoropropylene which was diluted with water to 20% (wt.) solids, and to which was added 0.1% (wt.), based on the total weight of the coating bath, of a material known as Carbopol–960 (supplied by the B. F. Goodrich Co.). The bath was prepared from 40 lbs. of the 55% solids fluoropolymer dispersion, 73 lbs. of water, and 51.3 grams of Carbopol–960. The primed base film was dipped into the aqueous fluoropolymer dispersion, passed between a set of metering rolls set with a 3-mil gap opening, contacted with a series of smoothing rolls, then dried by subjecting it to a temperature of 450° C. for 22 sec. The film speed for this operation was 32 ft./min.

Samples of the coated film were heat sealed at 350° C. under 20 lbs./sq. in. for 30 sec.

A control film was similarly prepared except that the silane priming step was omitted. Samples of this film were heat sealed under the same conditions specified above. The film of this example exhibited heat seals in the range of 1150 to 1275 g./in., and the control film exhibited heat seals of about 1300 g./in. Additional samples of both types of heat-sealed films were immersed in boiling water for four hours before testing the strength of the seals. The film of this example possessed seal strengths in the range of 400 to 500 g./in., while the seal strength of the control film were in the range of 100 to 150 g./in.

Samples of sealed film were also subjected to a humidity cycling test. In this test the heat-sealed film samples are placed in an oven at 71±2° C. with a relative humidity of 95±5%; after six hours under these conditions, the oven is allowed to cool to 38° C. or lower for 16 hours; heat is again supplied over a two-hour period to again reach a temperature of 71° C.; the 16-hour cooling/2-hour heating cycles are continued, and samples are taken at arbitrary intervals for assessing how the seal strength is holding up. The film of this example, when subjected to 20 days of humidity cycling, had a seal strength of 443 g./in.

EXAMPLE 2

A group of 6 in. x 9 in. x 1 mil sheets of the polypyromellitimide of bis(4-aminophenyl) ether was one-side primed with an 85.75/4.5/4.75/5 (volume ratio) ethanol/2 - propanol/water/gamma - aminopropyltriethoxysilane bath, by pouring the bath on one side of the film and removing the excess by drawing a quarter-inch diameter rod wound with 8-mil wire across the film surface. The film was permitted to air dry at ambient room temperature for 5 min., and then was dried in an oven at 85° C. for 15 min. The film was permitted to cool, and then was coated on the primed side with an aqueous fluoropolymer dispersion having the same composition as that of Example 1 by pouring the dispersion on the primed side of the film and removing the excess by drawing a quarter-inch diameter rod wound with 20 mil wire across the film surface. The coating was dried by heating the film in an oven heated at 400° C. for 3 min. The resulting film had good appearance. Samples of the film were heat sealed, coated side to coated side, at 350° C. under 20 lbs./sq. in. for 30 sec. The heat seal strength (average of six) was 1283 g./in. Samples of heat-sealed film were immersed in boiling water for 12.5 hours, and then in water at ambient room temperature for 16 hours, and found to have a seal strength (average of five) of 620 g./in.

The procedure of this example was repeated. The initial heat seal strength (average of four) was 1750 g./in. Sealed samples immersed in boiling water for 20.5 hours, and then in water at ambient room temperature for 31 hours, had a seal strength (average of six) of 700 g./in.

EXAMPLE 3

A roll of 1-mil film of the polypyromellitimide of bis(4-aminophenyl) ether was primed with a 2.5% by weight solution of gamma-aminopropyltriethoxysilane in water, by dipping the film into the priming bath, passing it between metering rolls and then in contact with polytetrafluoroethylene wipers, and passing through a drying oven heated at 260 to 315° C. for 36 sec. Upon exit from this drying oven, the primed film was passed into an aqueous fluoropolymer coating bath having the same composition as that of Eaxmple 1. After passing through the coating bath, the film was passed between metering rolls, contacted with smoothing rolls, and then passed through an oven heated at 450° C., the dwell time in the oven being 36 sec. The whole operation was carried out at a film speed of 20 ft./min.

Samples of the resulting film were heat sealed at 350° C. under 20 lbs./sq. in. for 30 sec. The heat seal strength (average of 24) was 760 g./in. Heat-sealed samples immersed in boiling water for 2.5 hours before testing exhibited seal strengths (average of four) of 400 g./in.

EXAMPLE 4

A roll of 1-mil film of the polypyromellitimide of bis(4-aminophenyl) ether was primed on one side with a 5% by weight solution of gamma-aminopropyltriethoxysilane in water, by the kiss coating technique, wherein the film contacts a rotating applicator roll which dips into the primer bath; the film was then passed in contact with polytetrafluoroethylene wiping blades, and passed through an oven heated at 260 to 315° C.

Film of this invention and control film were prepared under precisely the same conditions by two-side coating the above one-side primed film; in this way an unprimed/coated control typical of the prior art was prepared simultaneously with, and as the reverse side of a silane-primed/coat film of this invention. The one-side primed film was passed into an aqueous fluoropolymer coating bath having the same composition as that of Example 1. After passing through the coating bath, the film was passed between doctor rolls set with an opening of 3 mils, contacted with smoothing rolls, and passed through an oven heated at 400–450° C.

Initial heat seals of the two different sides of the film were virtually identical. Seals for silane-primed/coated samples sealed to itself were in the range of 946 to 1020 g./in. Seals for unprimed/coated samples sealed to itself were in the range of 900 to 1030 g./in. However, marked differences became apparent when the two types of samples were subjected to the humidity cycling test described in Example 1. The pronounced inferiority of the control samples is seen from the data in the following table.

TABLE

| Film: | Heat-seal strength (g./in.) after indicated number of days of humidity cycling | | |
|---|---|---|---|
| | 5 days | 12 days | 15 days |
| Silane-primed/coated | 560 | 550 | 508 |
| Unprimed/coated control | 340 | 150 | 114 |

What is claimed is:

1. A method of manufacture for making laminar structures of polyimides and fluorocarbon polymeric materials which comprises contacting at least one surface of a polyimide film structure with gamma-aminopropyltriethoxysilane, applying to said surface a fluorocarbon polymer, and heating said structure at a temperature between about 325° C. and about 450° C.

2. The method of claim 1 wherein said gamma-aminopropyltriethoxysilane is in the form of an aqueous solution of between about 1% and about 10% by volume of gammaaminopropyltriethoxysilane.

References Cited

UNITED STATES PATENTS

| 3,179,634 | 4/1965 | Edwards | 161—227X |
| 3,179,635 | 4/1965 | Frost et al. | 260—78 |
| 3,355,347 | 11/1967 | Habermann | 161—189 |
| 3,408,453 | 10/1968 | Shelton | 161—189X |
| 3,455,774 | 7/1969 | Lindsey et al. | 161—189 |

HAROLD ANSHER, Primary Examiner

U.S. Cl. X.R.

161—165, 189, 208, 227; 174—110